United States Patent [19]

Young

[11] Patent Number: 4,928,584

[45] Date of Patent: May 29, 1990

[54] INFUSER

[75] Inventor: Michael J. R. Young, Ashburton, England

[73] Assignee: General Dispensing Systems Limited, Croydon, England

[21] Appl. No.: 294,484

[22] PCT Filed: Apr. 27, 1988

[86] PCT No.: PCT/GB88/00326

§ 371 Date: Dec. 27, 1988

§ 102(e) Date: Dec. 27, 1988

[87] PCT Pub. No.: WO88/08268

PCT Pub. Date: Nov. 3, 1988

[30] Foreign Application Priority Data

Apr. 28, 1987 [GB] United Kingdom ............... 8710045

[51] Int. Cl.⁵ .............................................. A47J 31/00
[52] U.S. Cl. .................................. 99/289 T; 198/494

[58] Field of Search .............. 99/279, 289 R, 289 T, 99/289 D, 289 P, 300, 302 R; 68/3 SS; 134/1; 366/127, 108, 109, 116, 120; 198/494, 499

[56] References Cited

U.S. PATENT DOCUMENTS

| 2,043,181 | 6/1936 | Lamort . | |
|---|---|---|---|
| 3,190,793 | 6/1965 | Starke | 68/3 SS |
| 3,429,253 | 2/1969 | Breitenstein | 99/283 |
| 4,134,332 | 1/1979 | Merman | 99/289 T |
| 4,539,827 | 9/1985 | Klein | 68/3 SS |

*Primary Examiner*—Robert W. Jenkins
*Attorney, Agent, or Firm*—Scrivener and Clarke

[57] ABSTRACT

An infuser comprises movable screen means, which is preferably a continuous mesh belt (1) passing around rollers (2). Infusible solid and infusing liquid are deposited onto the screen means (1) and means (5) below the screen collect the infusion. A piezo electric sandwich transducer (9) is provided for imparting ultrasonic vibrations to the screen to cause vibration of the screen means to aid cleaning thereof.

9 Claims, 3 Drawing Sheets

INFUSER

The present invention relates to an infuser. More particularly, but not exclusively, it relates to an infuser for use as an automatic brewer of fresh tea or coffee or the like.

In order to dispense beverages such as tea and coffee, it is necessary to infuse the grounds or tea-leaves in hot water for a time sufficient for the infusion process to be completed. Once infusion is complete, the infusion is separated from the grounds or tealeaves using a filter.

One method of carrying out such infusions is to use a suction process involving a reciprocating mechanism. This is necessarily complex and relatively slow. Another method is to use a filter screen made from wire or plastics mesh, or possibly a disposable paper filter held against a relatively coarse wire mesh. These mesh filters operate more easily than the suction process and are quicker in use. However, organic compounds from the grounds or tealeaves can build up on the filter and combine with calcium salts in hard water areas to block at least some of the mesh. Obviously, this slows the filtration process, eventually to an unacceptable degree.

It is an object of the present invention to provide an infuser which overcomes the above disadvantages and which is self-cleaning or at least may be cleaned automatically.

According to the present invention there is provided an infuser comprising movable screen means, means to deposit infusible solid and infusing liquid onto the screen means, means below the screen means to collect the infusion, and ultrasonic vibration generation means to cause vibration of the screen means to aid cleaning thereof.

The screen means may be a continuous mesh belt passing around rollers.

The collection means may be a tray beneath the screen and contacting the screen at at least one point, in which case a piezo electric sandwich transducer may be connected to the tray for imparting ultrasonic vibrations to the screen at said at least one point.

In one embodiment the piezo electric sandwich transducer may be connected to a blade which contacts the screen for imparting ultrasonic vibrations thereto.

In this case, the blade may have a curved end and contact the screen at an intermediate point of said curve.

The screen means may be provided with a plurality of regularly spaced holes to cooperate with a sprocket drive roller.

In this case, the belt may be coated in the region of the holes with a layer of rubber or plastics material.

Said material may be silicone rubber and/or PTFE.

In another alternative embodiment, the screen means may be a mesh belt extending between and wound around two rollers, winding firstly around one roller and then being reversed to wind around the other.

In this case, the belt may pass through a cleaning tank which may be ultrasonically vibrated.

An embodiment of the present invention will now be more particularly described by way of example and with reference to the accompanying drawings, in which.

Figure 1:
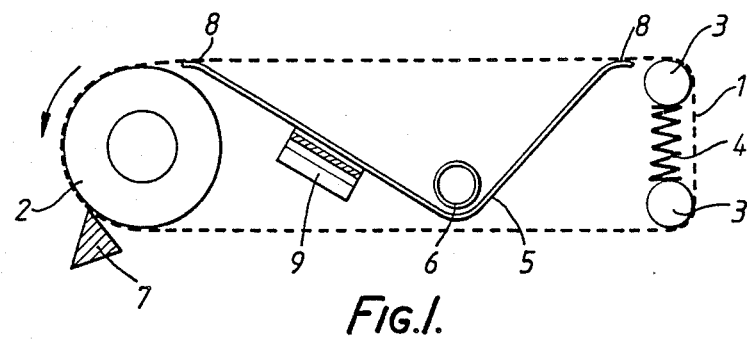
FIG. 1 shows schematically a side elevation of an infuser embodying the invention.

Referring now to the drawings, there is shown a continuous mesh belt 1, passing around a drive roller 2 and a pair of tensioning rolls 3 biased apart by spring means 4. The belt 1 thus remains under tension where it passes across a receiving tray 5.

Predetermined quantities of solids, generally tea-leaves or coffee grounds, and hot water are dispensed onto the belt over the tray 5 from a mixing vessel, not shown. The infusion starts in the mixing chamber, and continues on the belt until the water has drained through into the tray 5. The tea or coffee can then be dispensed from the tray through outlet 6.

Once the liquid has passed through the mesh belt, a motor is activated to drive roller 2, and there- fore the belt, in an anti-clockwise direction as seen in FIG. 1 so that the solid residues fall off into a waste container beneath the filter. A scraper 7 is provided to aid this process.

The belt 1 passes over a pair of guides 8, one at each end of the tray 5. In the embodiment shown in FIGS. 1 to 3, there is attached to the base of the tray, a piezo electric sandwich transducer 9 which is caused to produce ultrasonic vibrations and thereby vibrate the guides 8. The vibrating action of the guides imparts a dynamic force to the mesh belt at the points of contact and thereby dislodges any adhering particles.

Figure 2:
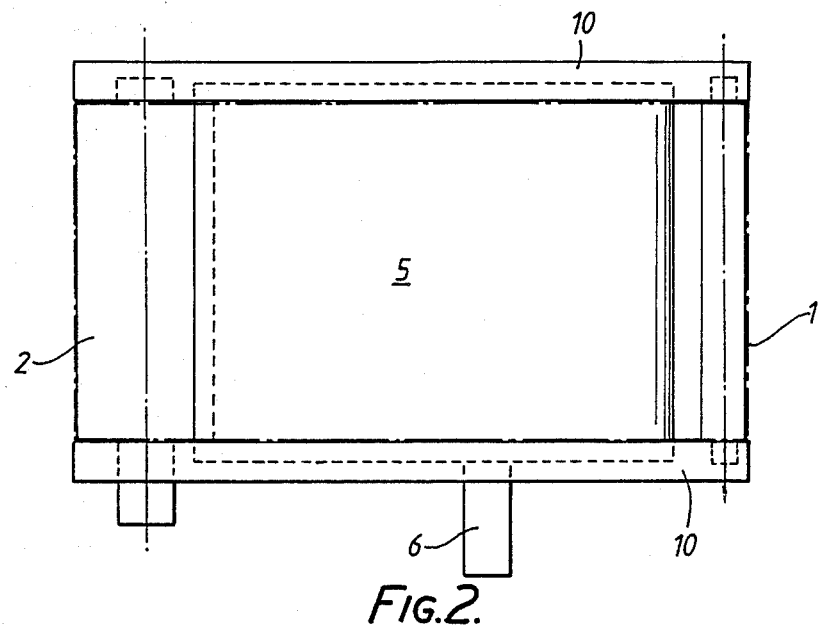
FIG. 2 is a plan view of an infuser cassette embodying the invention.
Figure 3:
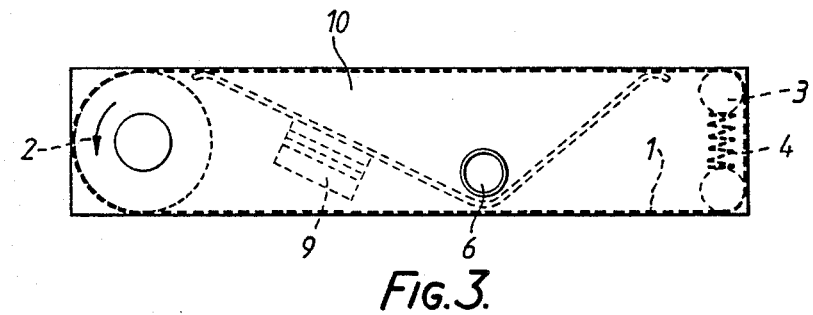
FIG. 3 is a side elevation of the cassette shown in FIG. 2.
Figure 4:
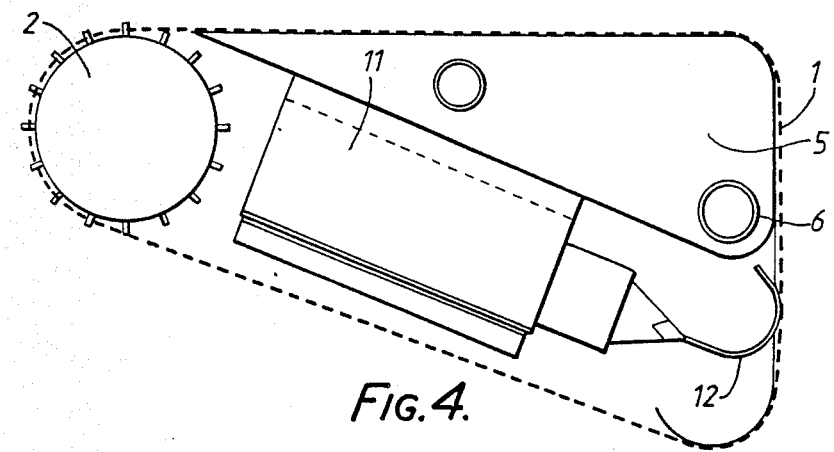
FIG. 4 is a schematic side elevation of another infuser embodying the invention.
Figure 5:
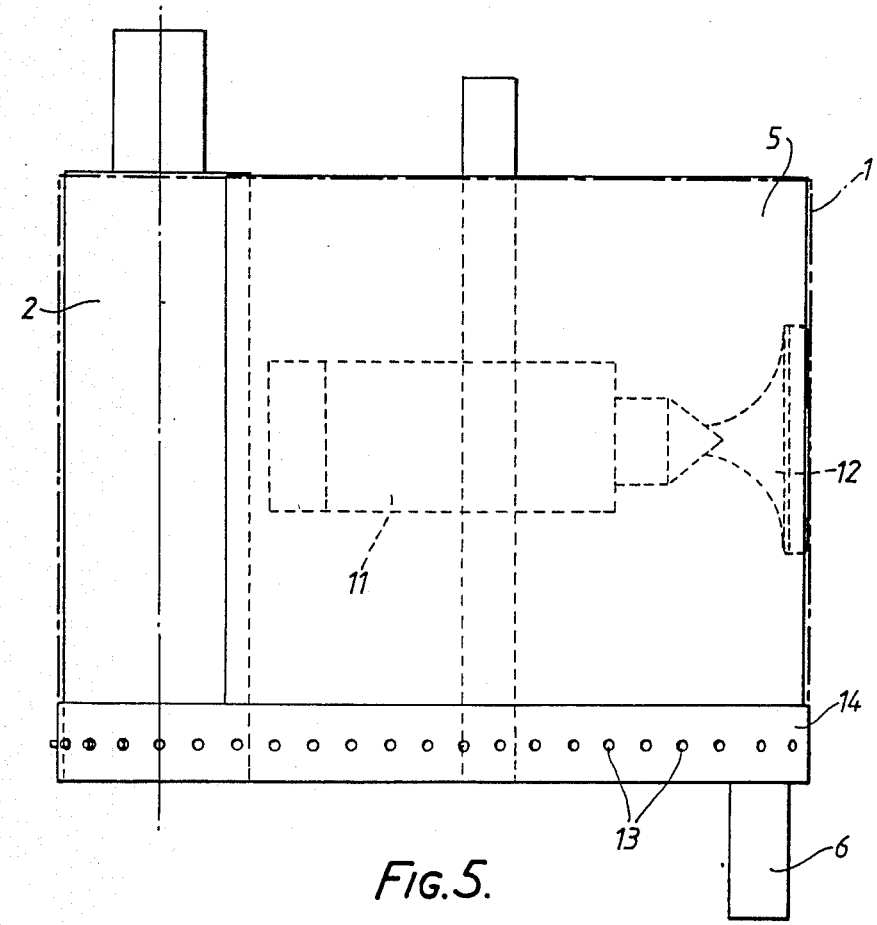
FIG. 5 is a plan view of the infuser of FIG. 4, showing underlying parts in phantom.
Figure 6:
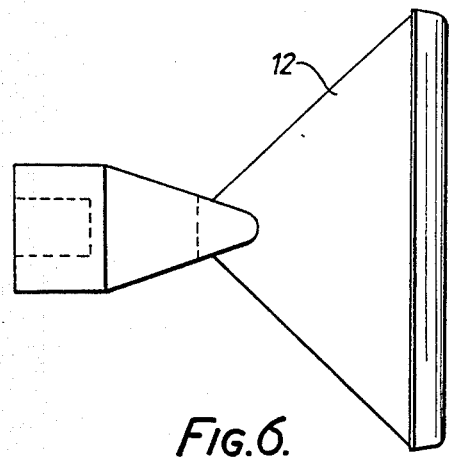
FIG. 6 is a top elevation of a vibratible blade for use with the infuser shown in FIGS. 4 and 5.
Figure 7:
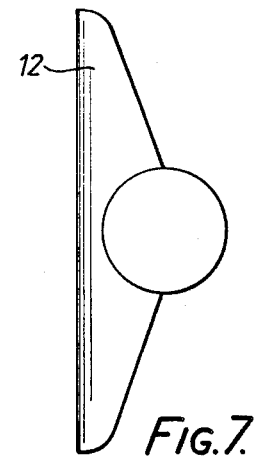
FIG. 7 is an end elevation of the blade of FIG. 6.
Figure 8:
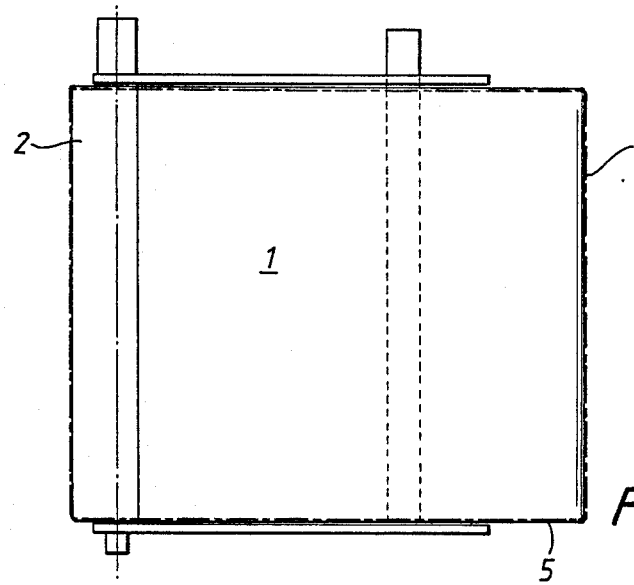
FIG. 8 is a top elevation of an infuser embodying the invention.
Figure 9:
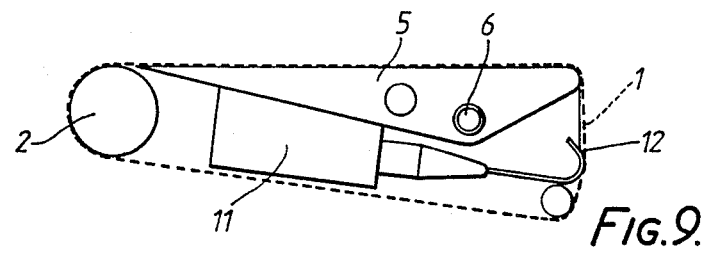
FIG. 9 is a schematic side elevation of the infuser of FIG. 8.

For convenience, the infuser may be constructed in the form of a cassette for insertion into a machine, such as a vending machine. This arrangement is shown in FIGS. 2 and 3 where, apart from the side plates 10, the remaining parts are similar to the arrangement shown in FIG. 1 and are numbered similarly.

Another embodiment is shown in FIGS. 4 to 9. In this embodiment a piezo electric sandwich transducer 11 is provided with a blade 12 curved at its end remote from the transducer. The curved end bears on the inside of the screen 1 and, when the transducer is activated, causes the screen to vibrate. The high flexured mode displacement amplitude causes the portion of the screen, extending substantially vertically, to vibrate in a direction normally to its direction of travel and any solid particles on the surface of the screen are thereby projected therefrom. Furthermore the ultrasonic vibrations cause cavitation in any retained water film in the screen to aid the cleaning process. The effectiveness of the process is demonstrated during the energised cycle, by a continuous spray of liquid projected through the mesh and carrying a large proportion of unwanted foreign matter which would otherwise build up on the belt.

In this embodiment, the driving roller 2 is provided with sprocket pins, and the screen 1 has regularly spaced holes 13 along one edge to cooperate with the sprocket roller. The edge may be coated to a width of, for example, 15 mm, with a layer 14 of silicone rubber or PTFE for strengthening purposes.

One further embodiment, not shown, is envisaged. In this further embodiment, the belt is linear and runs between two rolls. It passes first in one direction until an end is approached when the direction is reversed to wind onto the other roll. An infusing zone and collecting tray is disposed between these two rolls.

In this case, the solids may be removed by passing the belt in a loop through a cleaning tank, which may contain appropriate cleaning materials. The tank may be ultrasonically vibrated to improve the cleaning effect by virtue of induced cavitation.

I claim:

1. An infuser comprising a movable continuous mesh belt, roller means around which said mesh belt may pass, means to cause movement of the belt, means to deposit infusible solid and infusing liquid onto the mesh belt, collection means below the mesh belt to collect the infusion, contact means contacting the mesh belt, and ultrasonic vibration generating means connected to said contact means to impart ultrasonic vibration to the mesh belt to aid cleaning thereof.

2. An infuser as claimed in claim 1 wherein said ultrasonic vibration generating means is a piezo electric sandwich transducer.

3. An infuser as claimed in claim 2, wherein the collection means comprises a tray beneath the screen and said contact means comprises a part of said tray.

4. An infuser as claimed in claim 2, wherein said contact means comprises a cleaning blade.

5. An infuser as claimed in claim 4, wherein the blade has a curved end and contacts the screen at an intermediate point of said curve.

6. An infuser as claimed in claim 2, wherein the continuous mesh belt is provided with a plurality of regularly spaced holes to cooperate with a sprocket drive roller.

7. An infuser as claimed in claim 6, wherein the belt is coated in the region of the holes with a layer of material selected from the group consisting of rubber and plastic.

8. An infuser as claimed in claim 7, wherein said material comprises silicone rubber.

9. An infuser as claimed in claim 7, wherein said material comprises PTFE.

* * * * *